(12) United States Patent
Kuny

(10) Patent No.: US 9,439,406 B1
(45) Date of Patent: Sep. 13, 2016

(54) ICE FISHING TRAP

(71) Applicant: Julian Paul Kuny, Leduc (CA)

(72) Inventor: Julian Paul Kuny, Leduc (CA)

( * ) Notice: Subject to any disclaimer, the term of this patent is extended or adjusted under 35 U.S.C. 154(b) by 24 days.

(21) Appl. No.: 14/600,589

(22) Filed: Jan. 20, 2015

(51) Int. Cl.
*A01K 97/01* (2006.01)
*A01K 97/14* (2006.01)
*A01K 77/00* (2006.01)

(52) U.S. Cl.
CPC ............... *A01K 77/00* (2013.01); *A01K 97/01* (2013.01); *A01K 97/14* (2013.01)

(58) Field of Classification Search
CPC .............................. A01K 97/01; A01K 97/14
USPC .......................................................... 43/4, 5
See application file for complete search history.

(56) References Cited

U.S. PATENT DOCUMENTS

| | | | | |
|---|---|---|---|---|
| 876,638 A * | 1/1908 | Harrington | ........... | A01M 21/00 43/65 |
| 1,421,610 A * | 7/1922 | Svehla | ................. | A01M 23/00 43/77 |
| 1,421,611 A * | 7/1922 | Svehla | ................. | A01M 23/00 43/77 |
| 1,848,541 A * | 3/1932 | Norberg | ................ | A01M 23/36 241/231 |
| 2,493,100 A * | 1/1950 | Adams, Jr. | ............. | A01K 97/24 43/100 |
| 3,123,930 A * | 3/1964 | Rimar | .................... | A01K 97/14 43/5 |
| 3,267,603 A * | 8/1966 | Josephs | .................. | A01K 97/14 43/5 |
| 3,289,850 A * | 12/1966 | Gubash | ................. | A01K 97/01 210/470 |
| 3,363,355 A * | 1/1968 | Kellner | .................. | A01K 77/00 43/100 |
| 3,477,163 A * | 11/1969 | O'Connell | ............. | A01K 97/14 43/5 |
| 3,722,940 A * | 3/1973 | Misjak | ................... | A01K 97/01 294/210 |
| 3,747,253 A * | 7/1973 | Gangi | .................... | A01K 97/14 294/2 |
| 3,857,787 A * | 12/1974 | Kinne | .................... | A01K 97/01 210/470 |
| 4,718,188 A * | 1/1988 | Roberts | .................. | A01K 97/01 294/14 |
| 4,747,226 A * | 5/1988 | Todd | ...................... | A01K 97/01 43/4 |
| 4,769,939 A * | 9/1988 | Gonska | ................. | A01K 97/14 294/2 |
| 4,866,872 A * | 9/1989 | Guilbault | ............... | A01K 97/01 43/15 |
| 4,978,156 A * | 12/1990 | Marhula | ................ | A01K 97/01 210/470 |
| 5,024,757 A * | 6/1991 | Malak | .................... | B01D 29/03 210/136 |
| 5,048,220 A * | 9/1991 | Harris | .................... | A01K 61/00 43/1 |
| 5,072,538 A * | 12/1991 | Hendricks | .............. | A01K 97/01 210/470 |

(Continued)

FOREIGN PATENT DOCUMENTS

| CA | 1203200 A * | 4/1986 | ............. A01K 97/01 |
|---|---|---|---|
| CA | 2048943 C * | 5/1996 | ............. A01K 97/01 |

(Continued)

*Primary Examiner* — Darren W Ark
(74) *Attorney, Agent, or Firm* — Crossley & Stevenson Intellectual Property Law

(57) ABSTRACT

An ice fishing trap including first and second securement struts, each having a plurality of securement chain receiving first holes. The device also includes an adjustable crossbar engaging at least an aligned pair of first and second apertures in the securement struts, a support bar on a bottom end of the securement struts, a removable trap conforming to a diameter of an ice fishing hole and having a barrier, and a trap retaining latch. The trap is secured in an open position by the engagement of the trap retaining latch. As a fish is reeled in through the hole, the fish disengages the trap retaining latch which releases the trap into a closed position at a bottom of the ice fishing hole. The barrier prevents the fish from escaping if the fish falls from a hook. The support bar prevents the trap from falling below the ice fishing hole.

4 Claims, 4 Drawing Sheets

(56) References Cited

U.S. PATENT DOCUMENTS

| | | | | |
|---|---|---|---|---|
| 5,140,767 | A * | 8/1992 | Traut | A01K 97/01 210/470 |
| 5,218,777 | A * | 6/1993 | Olszowka | A01K 97/01 43/4 |
| 5,784,824 | A * | 7/1998 | Myroniuk | A01K 97/01 43/4 |
| 6,568,120 | B2 * | 5/2003 | Smolinski | A01K 97/01 43/4 |
| 6,618,978 | B1 * | 9/2003 | Miranowski | A01K 97/01 43/4 |
| 6,684,553 | B1 * | 2/2004 | Holum | A01K 97/01 43/4 |
| 6,694,662 | B1 * | 2/2004 | McClure | A01K 97/01 43/4 |
| 6,907,689 | B2 * | 6/2005 | Pendzimas | A01K 97/01 43/4 |
| 6,981,346 | B1 * | 1/2006 | Wiezycki | A01K 97/01 43/4 |
| 7,162,826 | B1 * | 1/2007 | Zander | A01K 97/14 43/4 |
| 7,698,850 | B2 * | 4/2010 | Harris | A01K 97/01 43/4 |
| 8,201,356 | B2 * | 6/2012 | Harris | A01K 97/01 43/15 |
| 8,943,735 | B2 * | 2/2015 | Brown | A01K 97/01 43/4.5 |
| 2007/0187145 | A1 * | 8/2007 | Periard | E21B 7/008 175/18 |

FOREIGN PATENT DOCUMENTS

| | | | | |
|---|---|---|---|---|
| CA | 2146786 | A1 * | 10/1996 | A01K 97/01 |
| CA | 2175279 | A1 * | 10/1997 | A01K 77/00 |
| CA | 2309223 | A1 * | 11/2001 | A01K 97/01 |
| SU | 376072 | A1 * | 4/1973 | |

* cited by examiner

ICE FISHING TRAP

BACKGROUND OF THE INVENTION

Various types of fish retaining devices are known in the prior art. However, what is needed is an ice fishing trap that prevents the loss of a fish through an ice fishing hole if the fish falls off a hook while being reeled in. In colder climate areas, the winters can be very cold, long and drawn out. Typically not many activities in which to participate are available due to inclement and cold weather. Many people in these colder areas participate in ice fishing for sport as an enjoyable way to pass time and also to obtain fresh fish for consumption. Losing a catch inside the ice fishing hole is a common occurrence. Most often the fish becomes unhooked while the fish are twisting and turning inside a diameter of the ice fishing hole while being reeled in. Currently, if the fish comes unhooked inside the diameter of the ice fishing hole, the fish will be lost. The present device has a trap with a barrier that is disengaged by the fish as the fish is being passed through the hole. The trap, after disengagement by the fish, lies in an open position at the bottom of the ice fishing hole and prevents the loss of the fish. Many recreational ice fishermen have heaters inside of their ice fishing huts and tents. If the fish becomes unhooked inside the ice fishing hut or tent, the fish poses a risk of flopping around and knocking over the heaters. The present device also allows the fisherman to release the fish inside the ice fishing hole and to pull the fish out of the ice fishing hole, thereby eliminating the risk of the fish poses. If a fish is unhooked and trapped in the ice fishing hole by the present device, the fisherman can pull the device up by a securement chain enabling the fisherman to grab the fish with his hands within the hole.

FIELD OF THE INVENTION

The present invention relates to fish retaining devices, and more particularly, to an ice fishing trap that is disengaged by a fish as the fish is being passed through an ice fishing hole and which can be adjusted to fit a diameter of any ice fishing hole.

SUMMARY OF THE INVENTION

The general purpose of the present ice fishing trap, described subsequently in greater detail, is to provide an ice fishing trap which has many novel features that result in an ice fishing trap which is not anticipated, rendered obvious, suggested, or even implied by prior art, either alone or in combination thereof.

To accomplish this, the present ice fishing trap includes parallel first and second securement struts, each of which has a front side, a back side, a top end, a bottom end, an inner side and an outer side. A length of each of the first and second securement struts is equal to a depth of an ice fishing hole. A support bar has a first end and a second end disposed on the bottom end of each of the respective first and second securement struts. The support bar has a length at least equal to a width of a distance between the first securement strut and the second securement strut.

A substantially U-shaped trap is provided to prevent the loss of a fish while the fish is being passed through the ice fishing hole. The trap has a left side and a right side removably disposed on the outer side of the respective first and second securement struts. The removability of the trap allows an ice fisherman to use one of multiple sized traps depending on the diameter of the ice fishing hole. A barrier is continuously disposed between the right side and the left side of the trap. The barrier is configured to prevent the passage of a fish therethrough. The barrier can be solid and alternately wire mesh so long as the barrier prevents the passage of the fish therethrough.

The support bar maintains the trap at a ninety degree angle relative the first and second securement struts to prevent the trap from falling below the ice fishing hole. The prevention of the trap falling below the ice fishing hole ensures that the fish cannot slip back into the water.

A height adjustable crossbar is centrally removably disposed between the inner side of each of the first and second securement struts. The crossbar is adjustable to various heights along the length of the first and second securement struts to accommodate differently sized traps thereby ensuring proper engagement of the trap while in an upright open position allowing the fish to pass through the ice fishing hole. A trap retaining latch is centrally disposed on the crossbar. The trap retaining latch is configured to engage and alternately disengage the trap. The engagement of the trap by the trap retaining latch places the trap in an open position which allows a fish to be pulled up into the ice fishing hole. When the fish is brought up into the ice fishing hole, the fish disengages the trap retaining latch, thereby releasing the trap to a disengaged closed position perpendicular to each of the first securement strut and second securement strut at a bottom of an ice fishing hole thus preventing the fish from escaping in the event that the fish comes off a fish hook while the fish is in the ice fishing hole.

A plurality of first holes is centrally disposed along an entire length of each of the front side and the back side of each of the first and second securement struts. At least a pair of first apertures is disposed on the inner side of each of the first and second securement struts. In addition, at least a pair of second apertures is disposed on the outer side of each of the first and second securement struts. The first apertures are directly aligned with the respective second apertures. Each of the first holes proximal the top end of each of the first and second securement struts is configured to receive a securement chain therethrough to hold the first and second securement struts in a vertical position while in use, which further prevents loss of the device into a body of water below the ice.

Thus has been broadly outlined the more important features of the present ice fishing trap so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
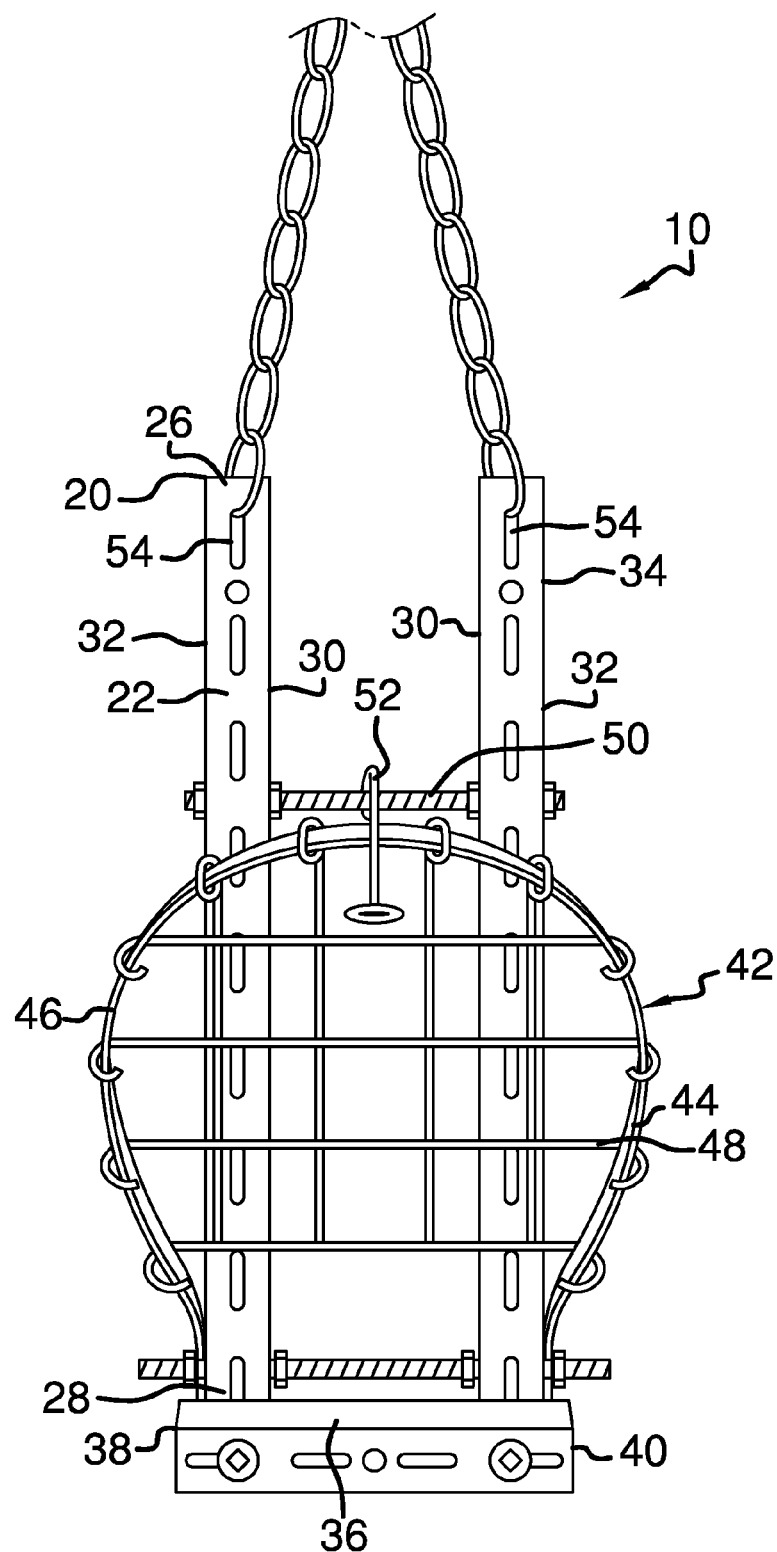
FIG. 1 is a front elevation view showing a trap in an upright open position.
Figure 2:
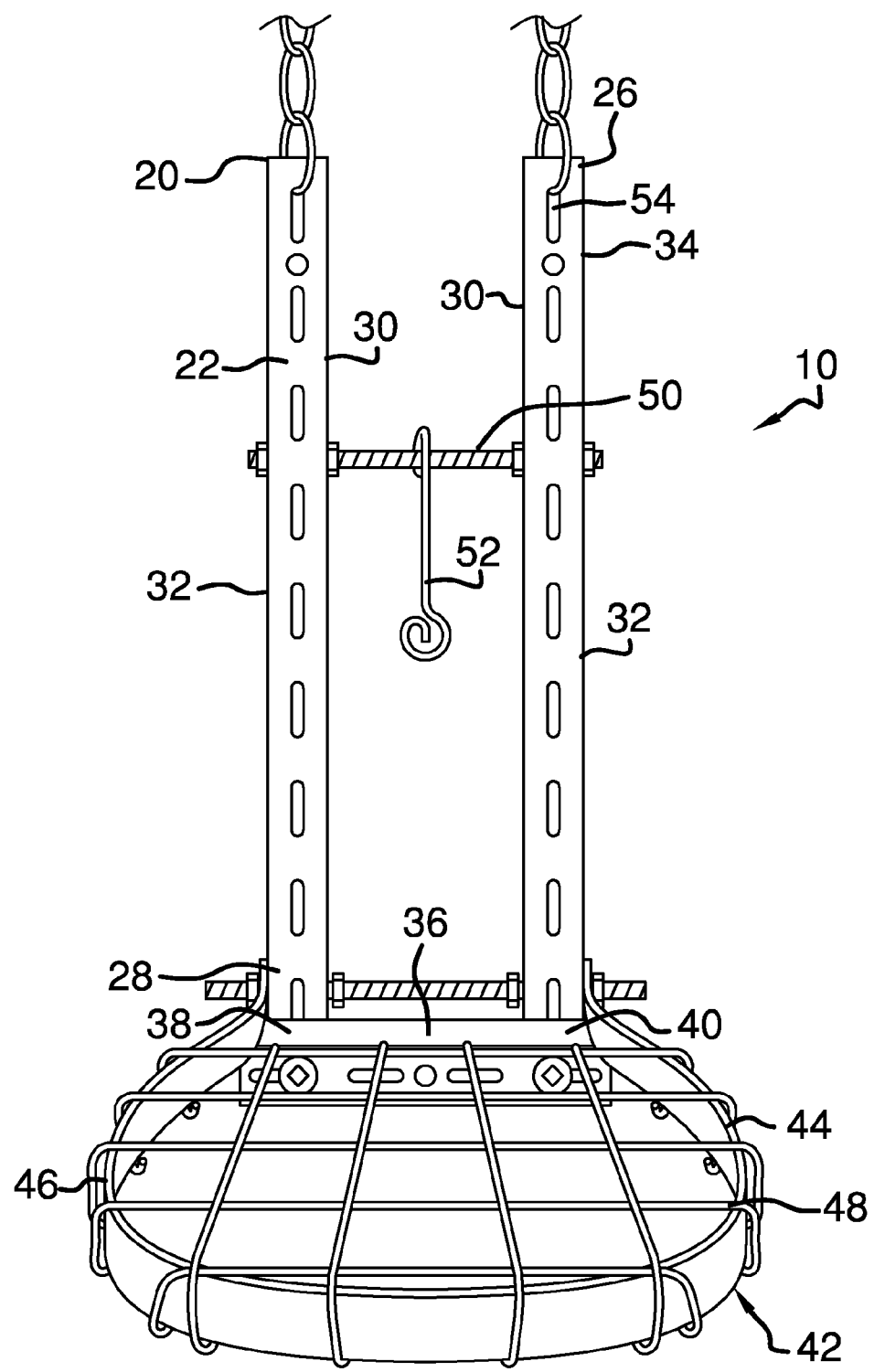
FIG. 2 is a front elevation view showing the trap in a disengaged closed position.
Figure 3:
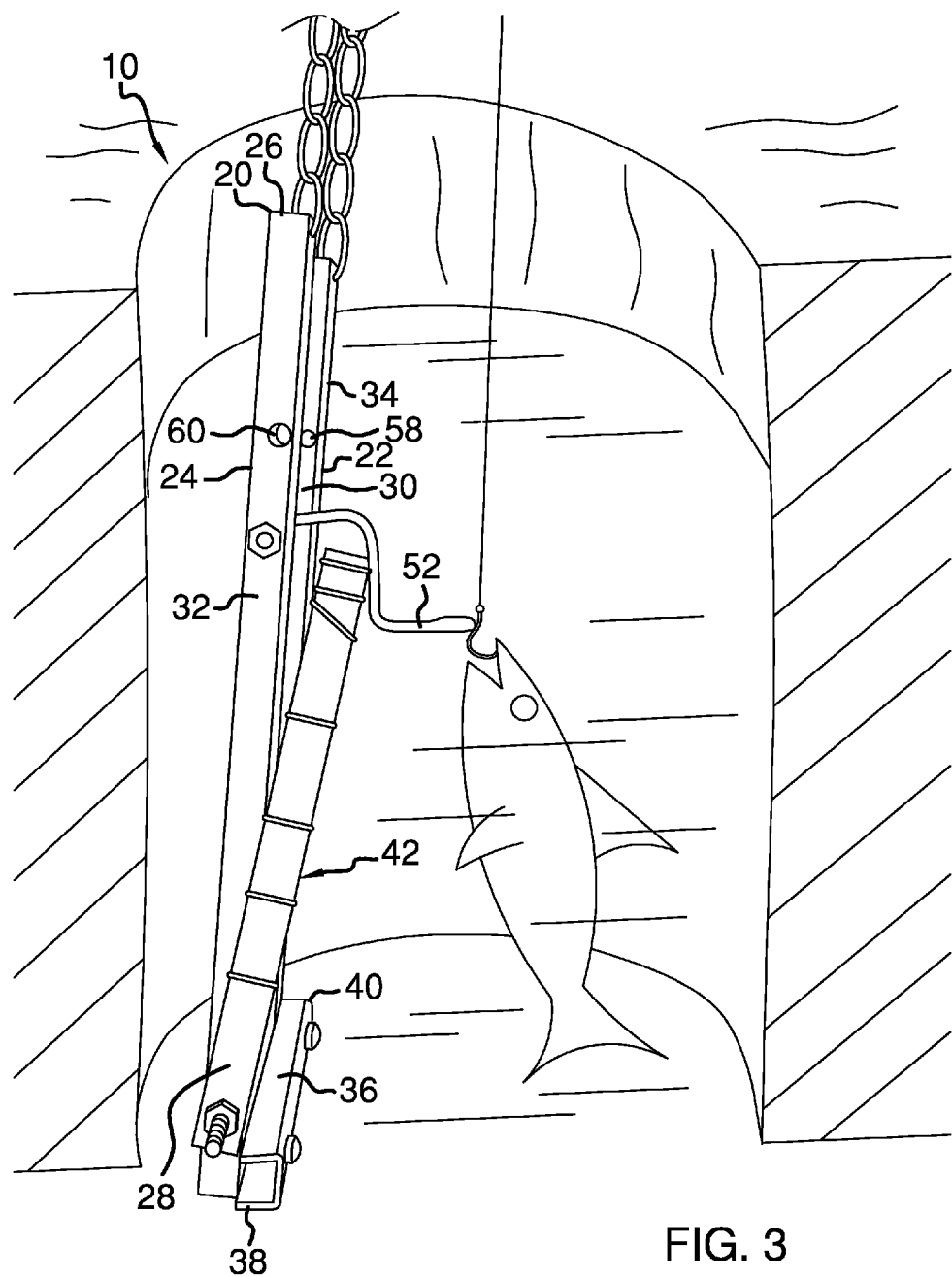
FIG. 3 is an in use side elevation view showing the trap in an upright open position.
Figure 4:
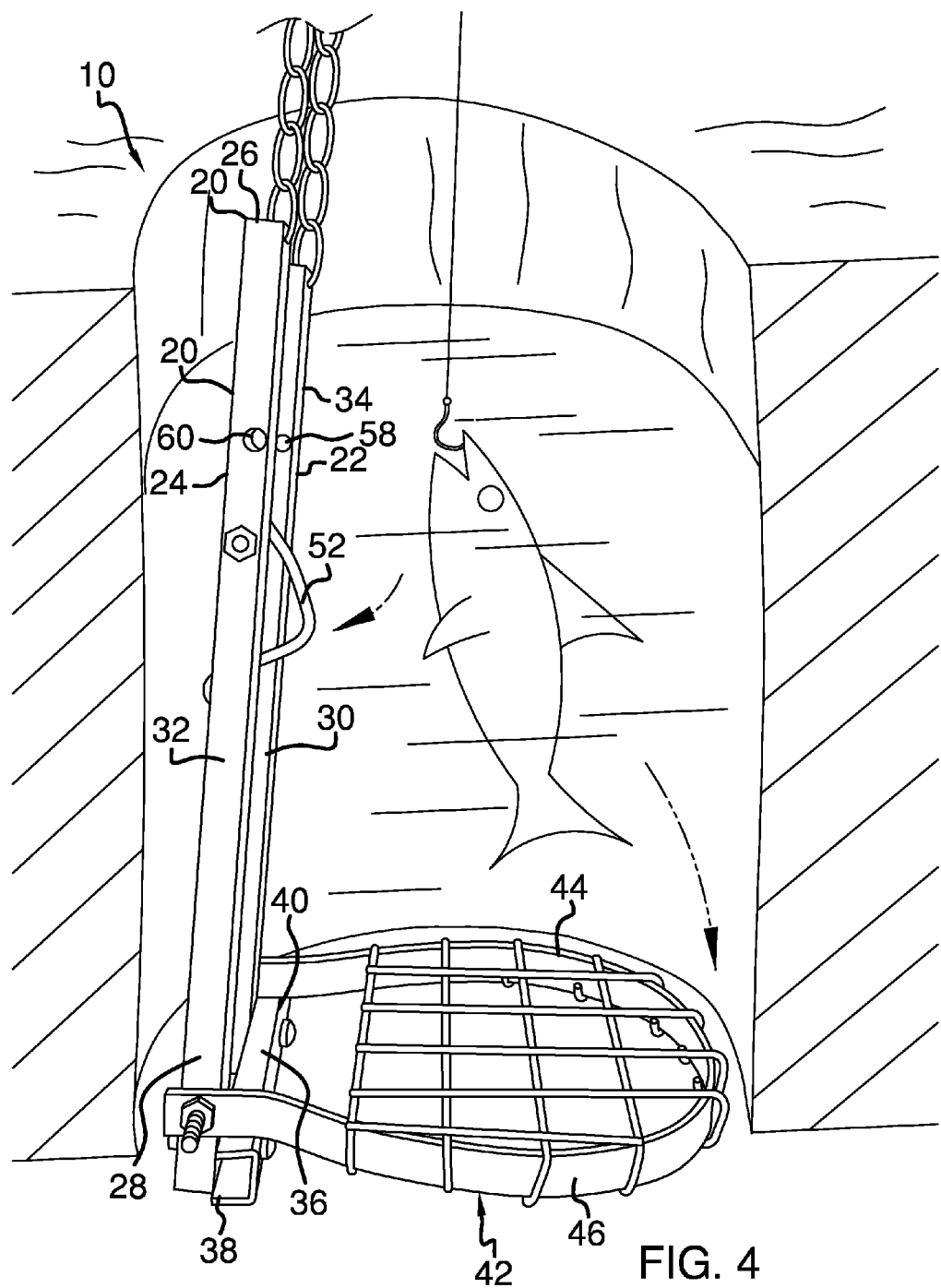
FIG. 4 is an in-use side elevation view showing the trap in a disengaged closed position.

With reference now to the drawings, and in particular FIGS. 1 through 4 thereof, an example of the instant ice fishing trap employing the principles and concepts of the present ice fishing trap and generally designated by the reference number 10 will be described.

Referring to FIGS. 1 through 4 the present ice fishing trap 10 is illustrated. The ice fishing trap 10 includes a first securement strut 20 and a second securement strut 34. Each of the first and second securement struts 20, 34 has a front side 22, a back side 24, a top end 26, a bottom end 28, an inner side 30 and an outer side 32. The first and second securement struts 20, 34 are parallel to each other and, while in use, the first and second securement struts 20, 34 are vertically disposed in the fishing hole.

A support bar 36 has a first end 38 and a second end 40 disposed on the bottom end 28 of each of the respective first and second securement struts. The support bar 36 has a length at least equal to a distance between the first securement strut 20 and the second securement strut 34.

A substantially U-shaped trap 42 is provided to prevent the loss of a fish while the fish is being passed through the ice fishing hole. The trap 42 has a right side 44 and a left side 46 removably disposed on the outer side 32 of the respective first and second securement struts 20, 34. The removability of the trap 42 allows an ice fisherman to use one of multiple sized traps 42 depending on the diameter of the ice fishing hole. A barrier 48 is continuously disposed between the right side 44 and the left side 46 of the trap. The barrier 48 is configured to prevent the passage of a fish therethrough. The barrier 48 can be solid and alternately wire mesh so long as the barrier prevents the passage of the fish therethrough.

The support bar 36 maintains the trap at a ninety degree angle relative the first and second securement struts 20,34 to prevent the trap 42 from falling below the ice fishing hole. The prevention of the trap 42 falling below the ice fishing hole ensures that the fish cannot slip back into the water.

A height adjustable crossbar 50 is centrally removably disposed between the inner side 30 of each of the first and second securement struts 20, 34. The crossbar 50 is adjustable to various heights along the length of the first and second securement struts 20, 34 to accommodate differently sized traps 42 thereby ensuring proper engagement of the trap 42 while in an upright open position allowing the fish to pass through the ice fishing hole. A trap retaining latch 52 is centrally disposed on the crossbar 50. The trap retaining latch 52 is configured to engage and alternately disengage the trap 42. The engagement of the trap 42 by the trap retaining latch 52 places the trap 42 in an open position which allows a fish to be pulled up into the ice fishing hole. When the fish is brought up into the ice fishing hole, the fish disengages the trap retaining latch 52, thereby releasing the trap 42 to a disengaged closed position perpendicular to each of the first securement strut and second securement strut 20, 34 at a bottom of an ice fishing hole thus preventing the fish from escaping in the event that the fish comes off a fish hook while the fish is in the ice fishing hole.

A plurality of first holes 54 is centrally disposed along an entire length of each of the front side 22 and the back side 24 of each of the first and second securement struts 20, 34. At least a pair of first apertures 58 is disposed on the inner side 30 of each of the first and second securement struts 20, 34. In addition, at least a pair of second apertures 60 is disposed on the outer side 32 of each of the first and second securement struts 20, 34. The first apertures 58 are directly aligned with the respective second apertures 60. The at least a pair of first apertures 58 and the at least a pair of second apertures 60 allow for the adjustable connection of the trap retaining latch 52 to each of the first 20 and second 34 securement struts.

Each of the first holes 54 proximal the top end 26 of each of the first and second securement struts 20, 34 is configured to receive a securement chain therethrough to hold the first and second securement struts 20, 34 in a vertical position while in use, which further prevents loss of the device 10 into a body of water below the ice, and adjusts the depth at which the first and second securement struts 20, 34 are set into an ice fishing hole so that the bottom end 28 is set at a depth of an ice fishing hole.

What is claimed is:
1. An ice fishing trap comprising:
a first securement strut having a front side, a back side, a top end, a bottom end, an inner side and an outer side;
a second securement strut identical to the first securement strut, the first securement strut vertically disposed parallel to the second securement strut;
a support bar having a first end and a second end, each of the first end and second end disposed on the bottom end of each of the respective first and second securement struts, the support bar has a length equal to at least a distance between the first and second securement struts;
a substantially U-shaped trap having a right side and a left side, each of the right and left sides disposed on the outer side of the respective first and second securement struts;
a barrier continuously disposed between the right and left sides, the barrier configured to prevent a passage of a fish therethrough;
a crossbar centrally disposed between the inner side of each of the first and second securement struts; and
a trap retaining latch centrally disposed on the crossbar, the trap retaining latch configured to engage and alternately disengage the trap;
wherein an engagement of the trap retaining latch and the trap hold the trap in an open position, wherein in the open position the trap is upright;
wherein a disengagement of the trap retaining latch releases the trap to a closed position, wherein in the closed position the trap is perpendicular to each of the first and second securement struts at a bottom of an ice fishing hole;
wherein the trap has a width substantially equal to a diameter of the ice fishing hole; and
wherein the support bar maintains the trap at a ninety degree angle relative to the first and second securement struts in the closed position, wherein the support bar is configured to prevent the trap from falling below the bottom of the ice fishing hole.
2. The ice fishing trap of claim 1 further comprising:
a plurality of first holes centrally disposed along an entire length of each of the first and second securement struts;
at least a pair of first apertures disposed on the inner side of each of the first and second securement struts; and
at least a pair of second apertures disposed on the outer sides of each of the first and second securement struts, each of the first apertures being in direct alignment with each of the respective second apertures;
wherein an aligned pair of the first holes proximal the top end of each of the first and second securement struts is configured to receive a lower end of a securement chain therethrough.
3. The ice fishing trap claim 2 wherein the trap is removable from the first and second securement struts.
4. An ice fishing trap comprising:
a first securement strut having a front side, a back side, a top end, a bottom end, an inner side and an outer side;

a second securement strut identical to the first securement strut, the first securement strut vertically disposed parallel to the second securement strut;

a support bar having a first end and a second end, each of the first end and second end disposed on the bottom end of each of the respective first and second securement struts, the support bar has a length equal to at least a distance between the first and second securement struts;

a removable substantially U-shaped trap having a right side and a left side, each of the right and left sides disposed on the outer side of the respective first and second securement struts;

a barrier continuously disposed between the right and left sides, the barrier configured to prevent a passage of a fish therethrough;

an adjustable crossbar centrally disposed between the inner side of each of the first and second securement struts;

a trap retaining latch centrally disposed on the crossbar, the trap retaining latch configured to engage and alternately disengage the trap;

a plurality of first holes centrally disposed along the entire length of each of the first and second securement struts;

at least a pair of first apertures disposed on the inner side of each of the first and second securement struts; and at least a pair of second apertures disposed on the outer sides of each of the first and second securement struts, each of the first apertures being in direct alignment with each of the respective second apertures;

wherein an engagement of the trap retaining latch and the trap hold the trap in an open position, wherein in the open position the trap is upright;

wherein a disengagement of the trap retaining latch releases the trap to a closed position, wherein in the closed position the trap is perpendicular to each of the first and second securement struts at a bottom of an ice fishing hole;

wherein the trap has a width substantially equal to a diameter of the ice fishing hole;

wherein the support bar maintains the trap at a ninety degree angle relative to the first and second securement struts in the closed position, wherein the support bar is configured to prevent the trap from falling below the bottom of the ice fishing hole;

wherein an aligned pair of the first holes proximal the top end of each of the first and second securement struts is configured to receive a lower end of a securement chain therethrough; and wherein the barrier is a grid of wire mesh.

* * * * *